US011535320B2

(12) United States Patent
Kong et al.

(10) Patent No.: US 11,535,320 B2
(45) Date of Patent: Dec. 27, 2022

(54) WALKING MECHANISM, ROBOT HAVING SAME, AND SELF-WALKING MOWER

(71) Applicant: Suzhou Cleva Precision Machinery & Technology Co., Ltd., Suzhou (CN)

(72) Inventors: Zhao Kong, Suzhou (CN); Ning Guo, Suzhou (CN); Jiangwei Cui, Suzhou (CN); Ronghua Xu, Suzhou (CN)

(73) Assignee: Suzhou Cleva Precision Machinery and Technology Co., Ltd., Suzhou (CN)

( * ) Notice: Subject to any disclaimer, the term of this patent is extended or adjusted under 35 U.S.C. 154(b) by 674 days.

(21) Appl. No.: 16/488,356

(22) PCT Filed: Jan. 18, 2018

(86) PCT No.: PCT/CN2018/073149
§ 371 (c)(1),
(2) Date: Aug. 23, 2019

(87) PCT Pub. No.: WO2018/153186
PCT Pub. Date: Aug. 30, 2018

(65) Prior Publication Data
US 2020/0239090 A1    Jul. 30, 2020

(30) Foreign Application Priority Data
Feb. 27, 2017    (CN) .......................... 201710109339.9

(51) Int. Cl.
*B62D 57/02*    (2006.01)
*A01D 34/00*    (2006.01)
(Continued)

(52) U.S. Cl.
CPC ......... *B62D 57/022* (2013.01); *A01D 34/008* (2013.01); *B60C 11/03* (2013.01);
(Continued)

(58) Field of Classification Search
CPC ........................... B62D 57/022; A01D 34/008; A01D 2101/00; B60C 11/03; B60C 11/0311; B60C 2011/0374; B60C 2200/14
(Continued)

(56) References Cited

U.S. PATENT DOCUMENTS 2,403,812 A * 7/1946 MacCallum ............ B60C 11/00
                                                         16/45
D497,590 S * 10/2004 Brown .......................... D12/570
(Continued)

FOREIGN PATENT DOCUMENTS

CN           1970319 A        5/2007
CN         102283749 A   *  12/2011
(Continued)

OTHER PUBLICATIONS

International Search Report for Application No. PCT/CN2018/073149, dated Apr. 20, 2018.

*Primary Examiner* — Mahmoud Gimie
(74) *Attorney, Agent, or Firm* — JK Intellectual Property Law, PA

(57) ABSTRACT

A walking mechanism for driving a machine body includes a walking wheel group having a plurality of walking wheels attached to the machine body, with two front and two rear wheels relative to a traveling direction. The machine body has two sides with a pair of one of the front wheels and a one of the rear wheels being respectively located on each of the sides and driven to rotate synchronously. Each walking wheel includes an auto tire casing with a tread outer side having a tread pattern distributed along a circumferential direction of the auto tire casing. The tread pattern is configured as a plurality of tread ribs with a respective tread groove formed between each adjacent pair of the tread ribs, the tread pattern radiating outward from an axial center of
(Continued)

the walking wheel. A related robot and self-walking mower are also disclosed.

15 Claims, 6 Drawing Sheets

(51) Int. Cl.
  *B60C 11/03* (2006.01)
  *A01D 101/00* (2006.01)
(52) U.S. Cl.
  CPC ...... *B60C 11/0311* (2013.01); *A01D 2101/00* (2013.01); *B60C 2011/0374* (2013.01); *B60C 2200/14* (2013.01)
(58) Field of Classification Search
  USPC .......................................................... 180/7.1
  See application file for complete search history.

(56) References Cited

U.S. PATENT DOCUMENTS

| | | | | |
|---|---|---|---|---|
| 2013/0284861 A1* | 10/2013 | Korus | ..................... | B60B 25/02 |
| | | | | 152/5 |
| 2015/0202917 A1* | 7/2015 | Korus | ....................... | B60C 7/24 |
| | | | | 152/5 |
| 2019/0160896 A1* | 5/2019 | Fredenburg | ............. | B60C 11/04 |

FOREIGN PATENT DOCUMENTS

| | | | | |
|---|---|---|---|---|
| CN | 102596594 | | 7/2012 | |
| CN | 102849136 A | | 1/2013 | |
| CN | 205468330 | | 8/2016 | |
| CN | 106114676 A | * | 11/2016 | ............ B62D 61/00 |
| CN | 206579417 U | | 10/2017 | |
| CN | 107521292 A | | 12/2017 | |
| GB | 498668 A | | 1/2019 | |
| JP | H07246963 A | | 9/1995 | |

* cited by examiner

WALKING MECHANISM, ROBOT HAVING SAME, AND SELF-WALKING MOWER

CROSS-REFERENCE TO RELATED APPLICATIONS

This application is a national stage of International Application No. PCT/CN2018/073149, filed Jan. 18, 2018, and claims benefit to Chinese Patent Application No. 201710109339.9, filed Feb. 27, 2017, both of which are incorporated by reference herein.

TECHNICAL FIELD

The present disclosure relates to a walking mechanism and a robot having the same, and particularly to a walking mechanism having four wheels and a self-walking mower having the same.

BACKGROUND

The manner of self-positioning of robotic mowers as currently carried out is to determine the central position of the blade which is calculated according to the position relation between the laser emitting source and the rotating center of the blade. The position of the laser emitting source is confirmed when the laser emitting position and the laser receiving position are coincided. When the mower rotates, the position of the laser emitting source to be calculated is changed, so that the entire calculating system is quite complex. If the machine body rotating center, the laser emitting source center, and the turntable rotating center are designed on the same vertical axis, the calculation of the system is greatly simplified, and the calculating efficiency is improved. Therefore, it is expected that the mower rotates in situ about the turntable center (e.g., the left and right wheels run in reverse at the same speed), but for most of the tread patterns, the sideslip is severe when rotating in situ.

If the tread pattern friction of the tire is too large (e.g., nail-shaped tread pattern), the tire will shake when rotating in situ, and in severe cases, a runout phenomenon will occur. If the friction force of the tread pattern is too small, the tire may sideslip when traveling straight.

In addition, when the robotic mower travels to various uneven ground surfaces, such as continuously and gradually changed uneven ground surfaces, wear and tear will be caused by long-term usage. In case of small steps, such as the small ground steps caused by ground decoration, generally the height differences of which are smaller than the wheel roller radius, local depressions or protrusions, ramp boundaries, and the boundary between entrance passage slopes or barrier-free passages and the ground, the walking mechanism of the robotic mower cannot adapt well, causing slipping or shaking during walking.

SUMMARY

The present disclosure provides a walking mechanism including a walking wheel group and walking motors driving the walking wheel group, wherein along the traveling direction of the walking mechanism, the walking wheel group comprises two front wheels arranged at the front and two opposite rear wheels, the front wheel and the rear wheel positioned on the same side are set to rotate synchronously, each walking wheel in the walking wheel group comprises a auto tire casing which can be supported on the ground, the auto tire casing comprises a tread outer side which contacts the ground when traveling and an opposite tread inner side, the tread outer side is provided with tread patterns distributed along the circumferential direction of the auto tire casing, the tread patterns are constructed as a plurality of tread ribs inclining towards the same direction, a tread groove is formed between every two tread ribs, an included angle is formed between the extending direction of each tread rib in a plurality of tread ribs and the traveling direction of each walking wheel, each walking wheel in the walking wheel group is arranged opposite to the extending direction of the tread ribs of the adjacent walking wheel, and the pattern formed by the tread patterns of the four walking wheels radiates outward from the center of the four walking wheels when looking up the walking mechanism from bottom to top.

As a further improvement of an embodiment of the present disclosure, the width of each tread rib decreases from its middle to both ends in the direction of its extension.

As a further improvement of an embodiment of the present disclosure, the auto tire casing further includes a first shoulder and a second shoulder located at both ends of the tread outer side along the axial direction of the auto tire casing, the auto tire casing has an equatorial plane perpendicular to the axial direction thereof and located at the central portion, and the first shoulder and the second shoulder are symmetrical with respect to the equatorial plane.

As a further improvement of the embodiment of the present disclosure, a plurality of reinforcing ribs are provided on the tread inner side, wherein a plurality of reinforcing ribs are provided between the first shoulder and the second shoulder and are uniformly distributed along the circumferential direction of the auto tire casing.

As a further improvement of an embodiment of the present disclosure, the first shoulder and the second shoulder have an inner side close to the equatorial plane and an outer side away from the equatorial plane, and the outer side is provided with a flange extending toward the rotating center of the auto tire casing.

As a further improvement of an embodiment of the present disclosure, the flange is parallel to the equatorial plane.

As a further improvement of an embodiment of the present disclosure, the included angle between the extending direction of each tread rib of a plurality of tread ribs and the traveling direction of each walking wheel is no less than 25 degrees.

As a further improvement of an embodiment of the present disclosure, each of the tread ribs is constructed in a fusiform shape.

As a further improvement of the embodiment of the present disclosure, there is an equal first wheel track between the two front wheels and between the two rear wheels, there is an equal second wheel track between the front wheel and the rear wheel on one side and between the front wheel and the rear wheel on the other side, and the degree of the included angle between the extending direction of each tread rib and the traveling direction of each walking wheel is the arctangent value of the ratio of the second wheel track to the first wheel track.

As a further improvement of the embodiment of the present disclosure, the tread pattern is provided with an attached pattern constructed as a plurality of protrusions and depressions extending in a direction at an included angle to the extending direction of the tread rib.

As a further improvement of the embodiment of the present disclosure, the extending direction of a plurality of protrusions or depressions is parallel to the traveling direction.

As a further improvement of an embodiment of the present disclosure, the extending direction of a plurality of protrusions or depressions has an included angle of not more than 10 degrees with the traveling direction.

As a further improvement of an embodiment of the present disclosure, the extending direction of a plurality of protrusions or depressions has an included angle of not more than 5 degrees with the traveling direction.

The present disclosure also provides a robot that can effectively adapt to various uneven ground surfaces while walking, and the robot comprises a machine body and the above-mentioned walking mechanism mounted on the machine body.

The disclosure also provides a self-walking mower which can effectively adapt to various uneven ground surfaces while walking, and the self-walking mower comprises a machine body and the above-mentioned walking mechanism mounted on the machine body.

Compared with the prior art, the disclosure has the beneficial effects that the walking mechanism can avoid the slipping phenomenon effectively when walking on various grounds and rotating in situ, the walking will be more stable and reliable, and the robot having the walking mechanism is more stable when moving forward/backward linearly, turning by utilizing the differential speed between the left wheel and the right wheel or rotating in situ, so that the walking and working efficiency is improved.

DETAILED DESCRIPTION

Figure 1:
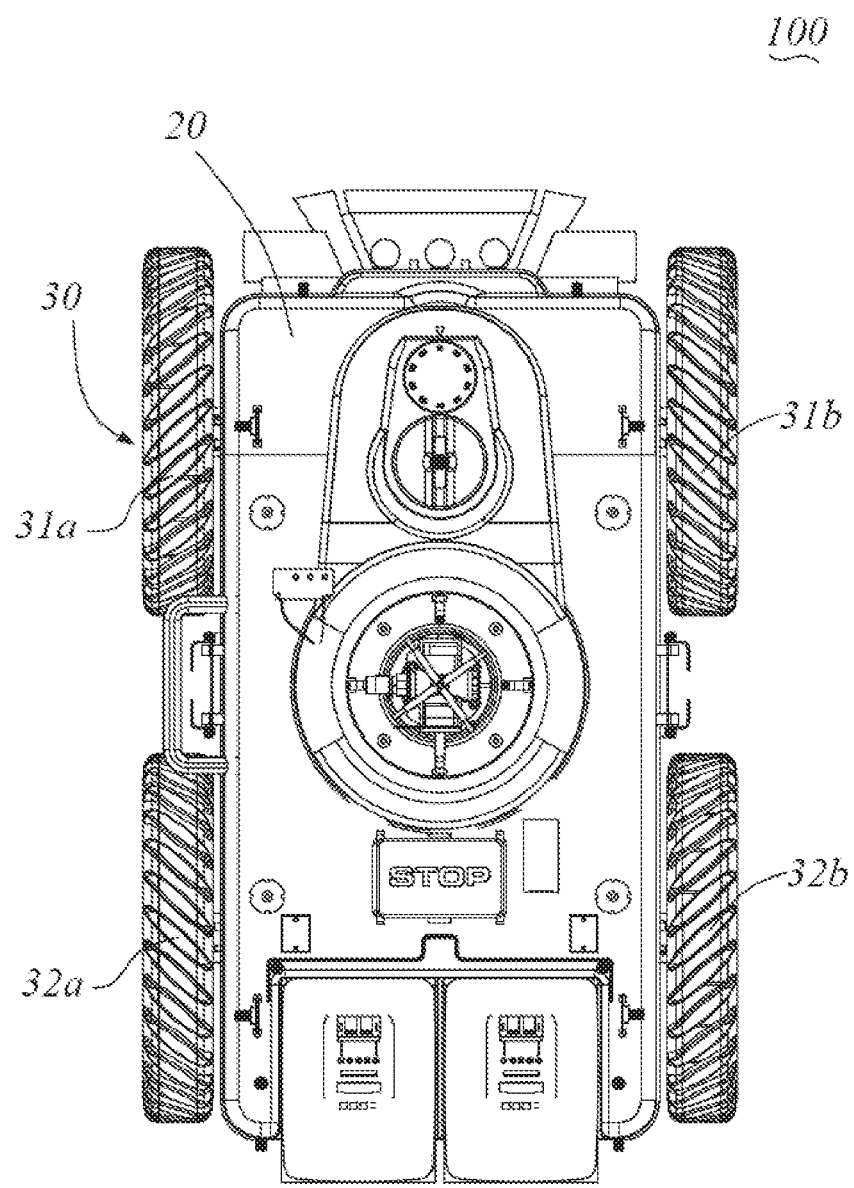
FIG. 1 is a top view of the robotic mower in accordance with the preferred embodiment of the present disclosure.

The present invention will be described in detail below in conjunction with the specific embodiments shown in the drawings. However, the embodiments are not intended to limit the invention, and the changes in structure, method, or function made by those skilled in the art in accordance with the embodiments are included in the scope of the present invention.

Figure 2:
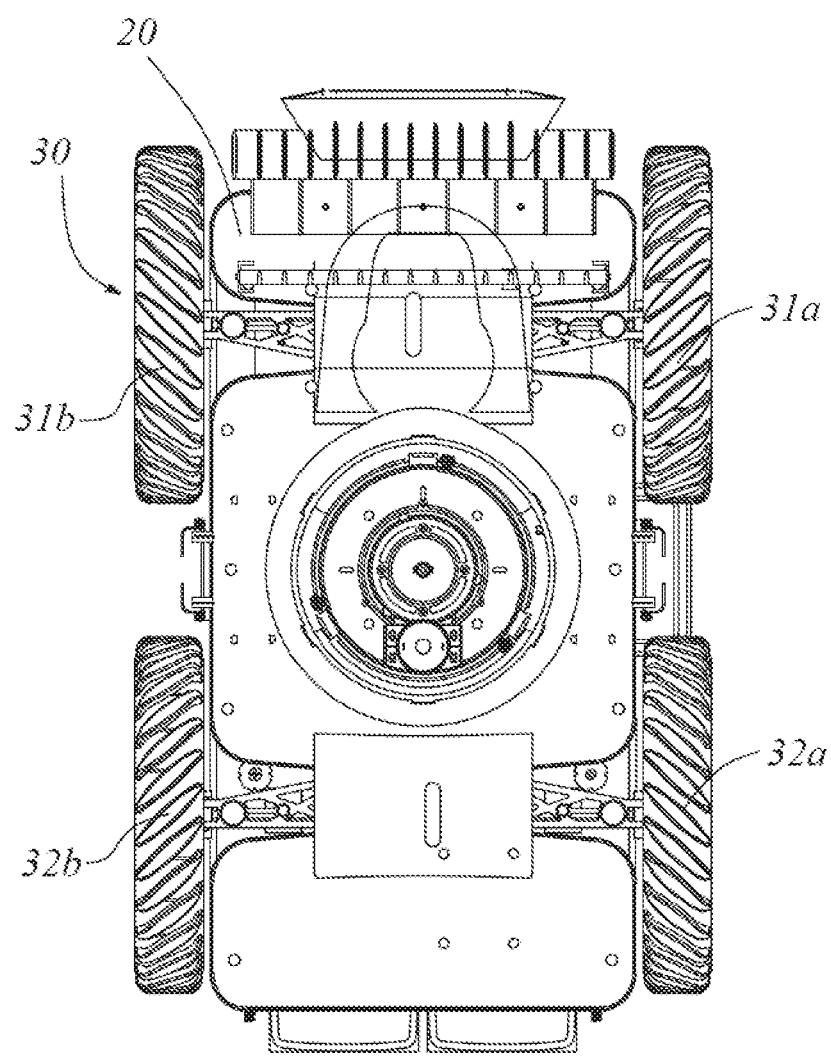
FIG. 2 is a bottom view of the robotic mower of FIG. 1.
Figure 3:
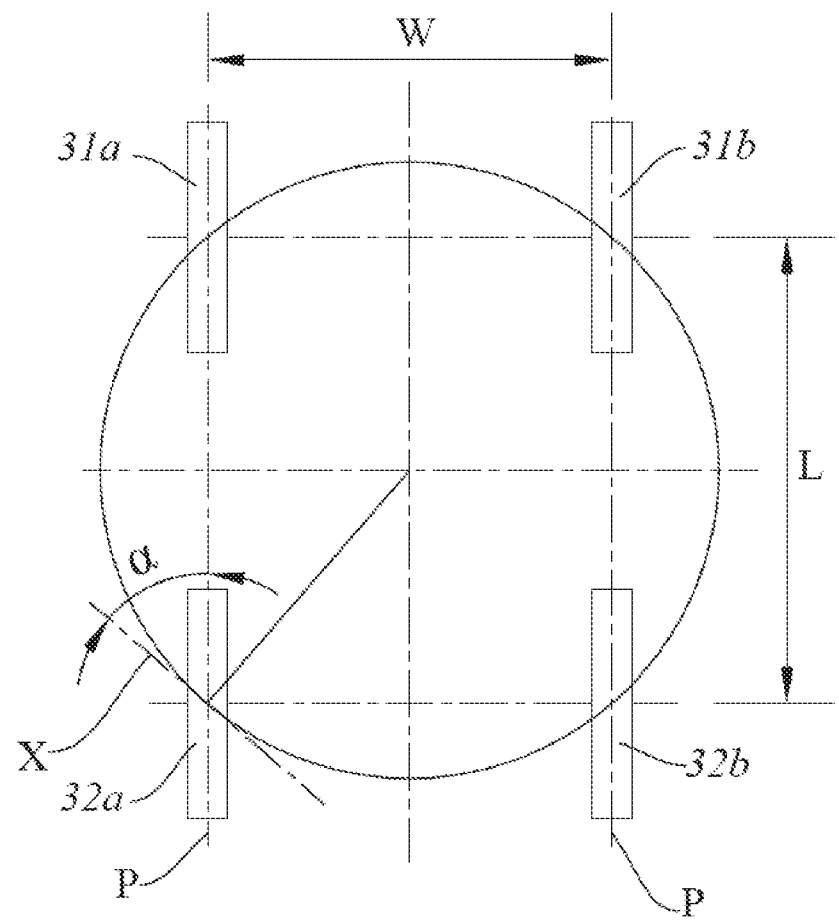
FIG. 3 is a diagrammatic view of the walking mechanism of the robotic mower of FIG. 1.
Figure 4:
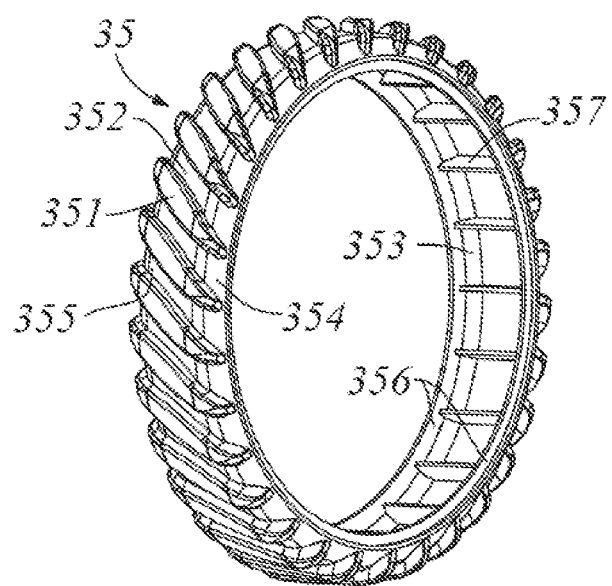
FIG. 4 is a perspective view of the auto tire casing of the walking wheel of the robotic mower of FIG. 1.
Figure 5:
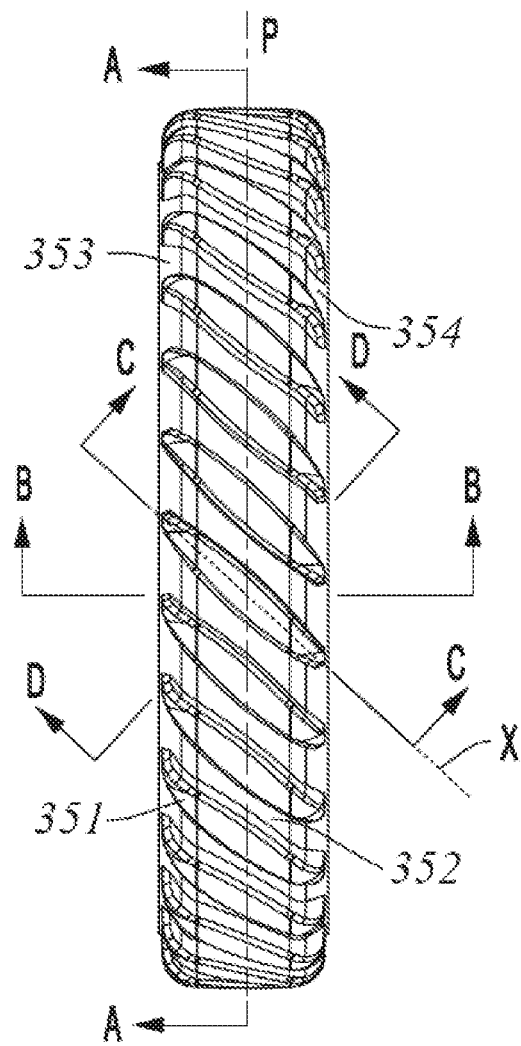
FIG. 5 is a front view of the auto tire casing of FIG. 4.
Figure 6:
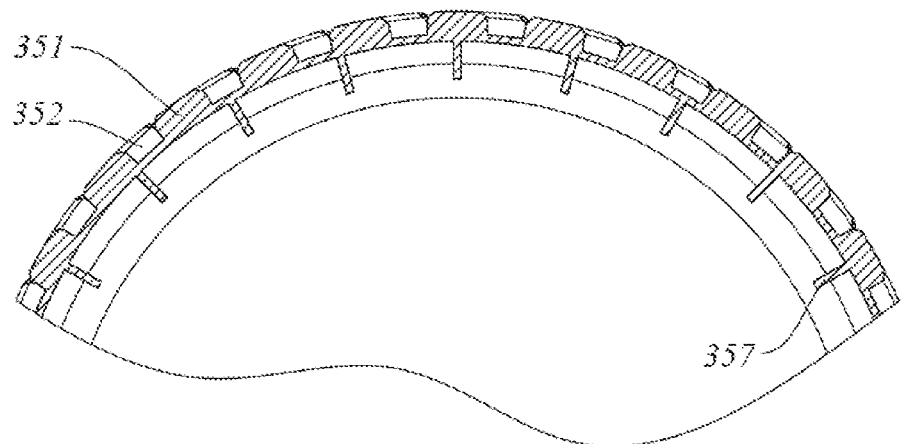
FIG. 6 is a cross-sectional view taken along line A-A of FIG. 5.
Figure 7:
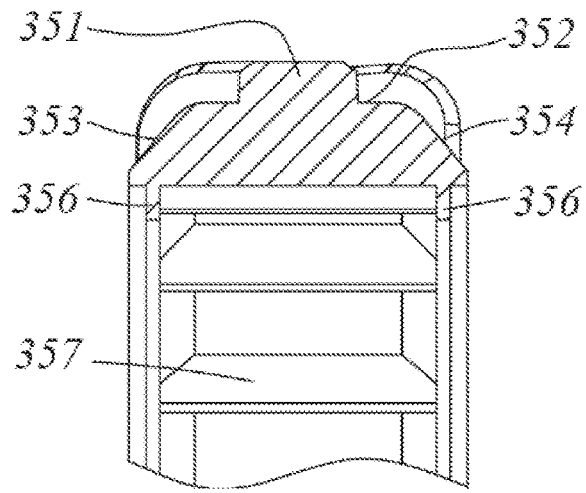
FIG. 7 is a cross-sectional view taken along line B-B in FIG. 5.

Referring to FIG. 1 to FIG. 3, in a preferred embodiment of the present disclosure, the robot is preferably a mowing robot 100 (or referred to as a self-walking mower), and the mowing robot 100 includes a machine body 20 and a walking mechanism 30 mounted on the machine body. The walking mechanism 30 includes a walking wheel group and walking motors (not shown in drawings) for driving the walking wheel group. The mowing robot 100 supplies power to the walking motor by using a cordless power source, such as a battery pack, a solar panel, etc., of course, the walking motors can also be supplied power by the use of a cable power supply connected to the commercial power supply. Those skilled in the art will appreciate that the walking motors in this embodiment can also be equivalently replaced with an internal combustion engine such as a gasoline engine, a diesel engine or the like. In this embodiment, the walking wheel group includes four walking wheels 31a, 31b, 32a, 32b, namely the front walking wheels 31a, 31b and the rear walking wheels 32a, 32b along the traveling direction of the mowing robot or the walking mechanism, wherein the traveling direction may be the forward direction or the backward direction, so the front and rear walking wheels are also based on relative perspective. Among them, the walking wheels on the same side are set to rotate synchronously, that is, the left front walking wheel 31a is synchronized with the left rear walking wheel 32a, and the right front walking wheel 31b is synchronized with the right rear walking wheel 32b. The traveling motors includes two driving motors, wherein the two travel motors are arranged in the front or in the rear, or one is arranged in the front and the other one is arranged in the rear. Each traveling motor can drive the traveling wheel on the same side to achieve synchronous rotation by means of belt drive, thereby performing the steering by the rotating speed difference between the left and right walking wheels without the need to provide a steering mechanism. Of course, it is also possible to drive four walking wheels by respectively using four walking motors.

Referring to FIGS. 4 to 9, the shapes and constructions of the four walking wheels are identical, and each of the walking wheels includes a hub (not shown) and an auto tire casing 35 mounted on the hub, wherein the auto tire casing may be a solid tire, and may also be a pneumatic tire. In order to enable the walking wheel to effectively adapt to various uneven ground surfaces, the auto tire casing 35 is provided with patterns of specific shape. Of course, the hub and the auto tire casing of the walking wheel can be integrally provided, that is, the auto tire casing is a part of the hub, and the corresponding patterns are provided on the surface of the hub contacting the ground. Specifically, the auto tire casing 35 includes a tread outer side that contacts the ground when walking and an opposite tread inner side. The tread outer side is provided with tread patterns along the circumferential portion of the auto tire casing. The tread patterns are constructed as a plurality of tread ribs 351 inclining in the same direction, and a groove 352 is formed between every two tread ribs 351, wherein a plurality of tread ribs and a plurality of grooves are alternately arranged, the grooves 352 and the tread ribs 351 are substantially parallel, and both the grooves 352 and the tread ribs 351 extend from one side of the auto tire casing 35 along the axial direction to the other side.

Preferably, in the embodiment, the tread rib 351 is substantially in fusiform shape, that is, the width of both ends of the tread rib 351 is relatively small, and the width of the middle portion of the tread rib 351 is relatively large, and it can also be considered that the width of the tread rib decreases gradually from middle to both ends of the rib in the extending direction of the rib. The tread outer side has shoulders on both sides along the axial direction of the auto tire casing 35 and a mid-surface 355 between the shoulders on both sides. The shoulders include a first shoulder 353 and a second shoulder 354 which are symmetric with respect to the equatorial plane P of the auto tire casing, wherein the equatorial plane P is the plane perpendicular to the axial direction of the auto tire casing 35 and located at the middle thereof. In the description about the shoulders, the side close to the equatorial plane P of the auto tire casing is regarded as the inner side, and the side away from the equatorial plane P of the auto tire casing is regarded as the outer side. Wherein, the mid-surface 355 is substantially an annular surface, and the shoulders are disposed obliquely with respect to the mid-surface 355, that is, the shoulders are inclined from the mid-surface 355 toward the rotating center of the auto tire casing 35. The outer side of the shoulders includes flanges 356 that extend toward the rotating center of the auto tire casing, generally parallel to the equatorial plane P of the auto tire casing.

A plurality of reinforcing ribs 357 are disposed on the tread inner side, wherein the reinforcing ribs 357 are located between the first shoulder 353 and the second shoulder 354, and are evenly arranged along the circumferential direction of the auto tire casing 35 for maintaining the distance between the first shoulder 353 and the second shoulder 354.

Further, the angle between the extending direction of each of a plurality of tread ribs 351 (the axis X in FIG. 5) and the equatorial plane P or the traveling direction of the auto tire casing 35 is an acute angle α, wherein a is particularly more than 25 degrees and less than 90 degrees, and the further preferred embodiment is that a is greater than 40 degrees and less than 50 degrees. In this embodiment, a is 48 degrees. Specifically, the angle can be calculated according to the left-right wheel track and the front-rear wheel track. As shown in FIG. 3, in the present embodiment, preferably, the wheel track between the two front wheels is equal to the wheel track between the two rear wheels, that is, between the two front wheels and between the two rear wheels have an equal first wheel track W, where the left-right wheel track can be considered as the distance between the equatorial planes P of the two front wheels or the distance between the equatorial planes P of the two rear wheels. If the wheel track between the front and rear wheels on the left side is equal to the wheel track between the front and rear wheels on the right side, that is, between the front and rear wheels on one side and between the front and rear wheels on the other side have an equal second wheel track L, wherein the front-rear wheel track can be considered as the distance between the rotation axis of the front and rear wheels on the same side. Then, that is, tan α=L/W, α is equal to the arctangent value of the ratio of the second wheel track to the first wheel track.

When looking down the robot from the top to the bottom, the distribution center of the four walking wheels (i.e., the geometric center of the rectangle obtained by connecting the intersections of the four walking wheels and the axles) is taken as the center, the distance from the center to the intersection of the axle and the equatorial plane P is taken as the radius, and the intersection of the axle and the equatorial plane P is taken as the point of tangency to make the tangent line of the circle, wherein the tangent line is the axis X, and when looking up the mowing robot from the bottom to the top, the pattern formed the pattern formed by the tread patterns of the four walking wheels radiates outward from the center of the four walking wheels, that is to say, the pattern of the walking wheel contacting the ground surface radiates outward from the center of the four wheels, thereby ensuring that the mowing robot is more stable when moving straightly forward/backward, turning by the use of the speed difference between the left and right wheels or rotating in situ.

The walking mechanism in the above embodiment can also be applied to other robots, such as a robot that implements automatic vacuum cleaning, a robot that realizes automatic watering, and the like.

Figure 10:
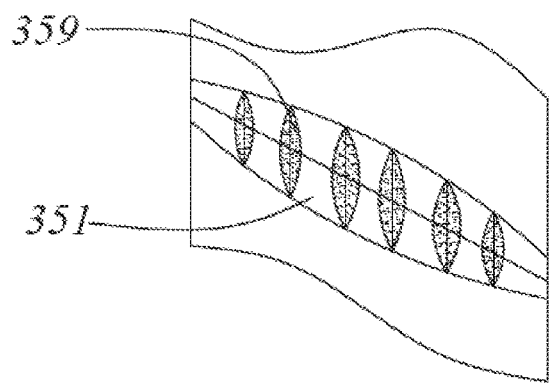
FIG. 10 is a schematic view of the first embodiment in which an attached pattern is provided on the tread pattern of the walking wheel in the preferred embodiment of the present disclosure.
Figure 8:
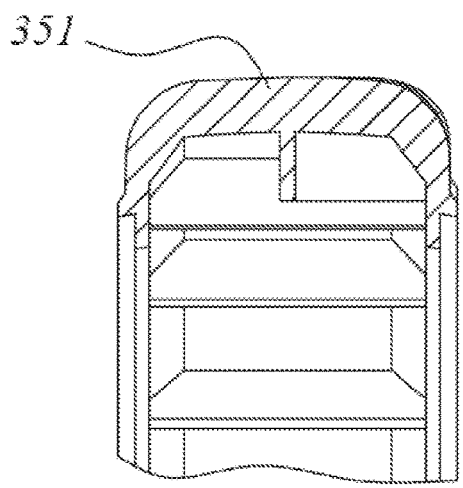
FIG. 8 is a cross-sectional view taken along line C-C of FIG. 5.
Figure 11:
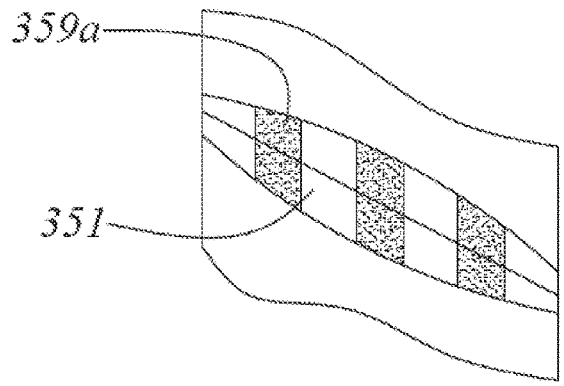
FIG. 11 is a schematic view of the second embodiment in which an attached pattern is provided on the tread pattern of the walking wheel.
Figure 9:
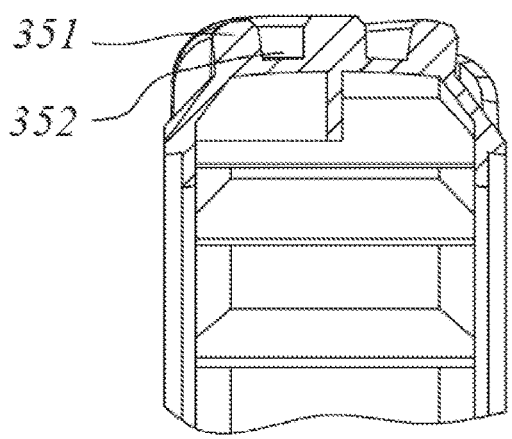
FIG. 9 is a cross-sectional view taken along line D-D of FIG. 5.
Figure 12:
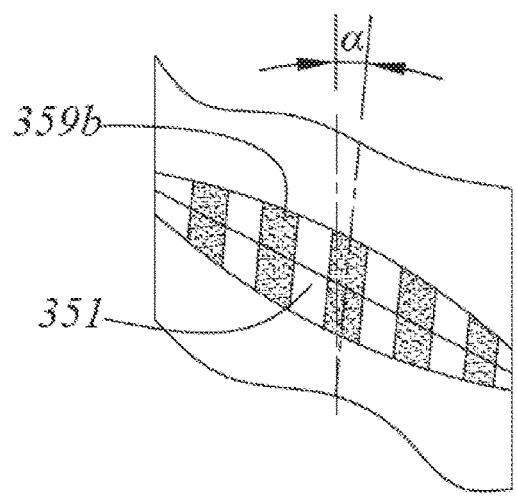
FIG. 12 is a schematic view of the third embodiment in which an attached pattern is provided on the tread pattern of the walking wheel.
Figure 13:
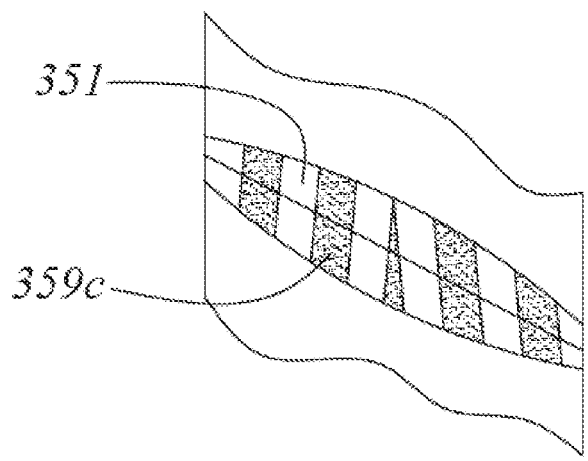
FIG. 13 is a schematic view of the fourth embodiment in which an attached pattern is provided on the tread pattern of the walking wheel.
Figure 14:
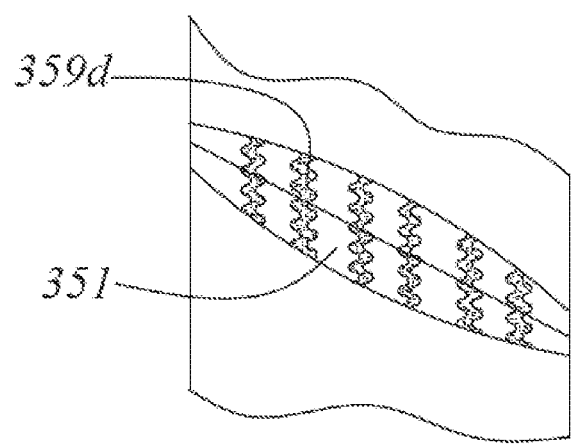
FIG. 14 is a schematic view of the fifth embodiment in which an attached pattern is provided on the tread pattern of the walking wheel.

Referring to FIG. 10 to FIG. 14, in a preferred embodiment of the present disclosure, an attached pattern may be provided on the tread pattern of the walking wheel, that is, an attached pattern is provided on each of the tread ribs 351, wherein the attached pattern is constructed as a plurality of protrusions and depressions extending in the direction oblique to the extending direction of the tread ribs. Referring to FIG. 10, the attached pattern 359 of the first construction is shown, wherein the extending directions of a plurality of protrusions or depressions are substantially parallel to the traveling direction of the walking wheels, that is, the extending directions of a plurality of protrusions or depressions are substantially parallel to each other, each of the protrusions or depressions is constructed in a fusiform shape, and a plurality of protrusions or depressions are evenly arranged along the extending direction of tire ribs 351. The direction of extension is evenly set. Referring to FIG. 11, the attached pattern 359a of the second construction is shown, where the difference from the first construction is in that each of the protrusions or depressions is constructed to be substantially rectangular. Referring to FIG. 12, the attached pattern 359b of the third construction is shown, wherein the included angle α between the extending direction of a plurality of protrusions or depressions and the traveling direction of the walking wheel is between 0 to 10 degrees, and more preferably is between 0 to 5 degrees, and the extending directions of a plurality of protrusions or depressions are substantially parallel to each other. Referring to FIG. 13, the attached pattern 359c of the fourth construction is shown, wherein the extending directions of a plurality of protrusions or depressions are irregularly arranged with each other, wherein the irregularity here means that the included angle between the extending direction of each of the protrusions or depressions and the traveling direction of the walking wheel may be different, that is, the extending directions of a plurality of protrusions or recesses are not parallel to each other; or the shape of each of the protrusions or depressions may be different, such as a plurality of protrusions or depressions has a combination of two or more of a rectangular shape, a triangular shape, a fusiform shape, and the like. Referring to FIG. 14, the attached pattern 359d of the fifth construction is shown, wherein each of the protrusions or depressions is constructed in a substantially serpentine shape. The attached pattern is not limited to the above-mentioned several shapes, and may be a regular or irregular construction, as long as the extending direction thereof intersects with the extending direction of the tread pattern, thereby further ensuring the mowing robot more stable when moving linearly forward/backward, turning by the use of the speed difference between the left and right wheels or rotating in situ.

It should be understood that although the description is described in terms of embodiments, not every embodiment includes only one independent technical solution. The description of the specification is merely for the sake of clarity, and those skilled in the art should take the specification as a whole, and the technical solutions in the various embodiments may also be combined appropriately to form other embodiments that can be understood by those skilled in the art.

The detailed descriptions set forth above are merely illustrative of the possible embodiments of the present invention, and are not intended to limit the scope of the present invention. Embodiments or modifications are intended to be included within the scope of the invention.

The invention claimed is:

1. A walking mechanism for driving a machine body, the walking mechanism comprising:
    a walking wheel group including a plurality of walking wheels attached to the machine body, the walking wheels including two front wheels at a front of the machine body and two rear wheels at a rear of the machine body, a traveling direction of the machine body being from the rear of the machine body toward the front of the machine body, the machine body having two sides, a pair of one of the front wheels and a one of the rear wheels being respectively located on each of the sides, each pair being driven to rotate synchronously; and
    each walking wheel including an auto tire casing with which the walking wheel can be supported on the ground, the auto tire casing having a tread outer side, each tread outer side having a tread pattern distributed along a circumferential direction of the auto tire casing, the tread pattern being configured as a plurality of tread ribs with a respective tread groove formed between each adjacent pair of the tread ribs, the tread pattern radiating outward from an axial center of the walking wheel;
    wherein each tread pattern is configured with the plurality of tread ribs each having an extending direction between sides of the auto tire casing inclining at an angle relative to the traveling direction, wherein the angle is an acute angle.

2. The walking mechanism according to claim 1, wherein the tread patterns the walking wheels are identical, and a mounting direction of the auto tire casing of any given walking wheels in the walking wheel group is opposite to a mounting direction of the auto tire casing of any adjacent walking wheel so that the angle relative to the traveling direction of the any given walking wheel is opposite the angle relative to the traveling direction of the any adjacent walking wheel.

3. The walking mechanism according to claim 1, wherein there is an equal first wheel track between the two front wheels and between the two rear wheels, there is an equal second wheel track between the front wheel and the rear wheel on one side and between the front wheel and the rear wheel on the other side, and the angle relative to the traveling direction is the arctangent value of the ratio of the second wheel track to the first wheel track.

4. The walking mechanism according to claim 1, wherein angle relative to the traveling direction is an acute angle of no less than 25 degrees.

5. The walking mechanism according to claim 1, wherein each tread rib has a middle between two ends along an extending direction between sides of the auto tire casing, a width of each tread rib decreases gradually from the middle toward both ends.

6. The walking mechanism according to claim 5, wherein the auto tire casing further includes a first shoulder and a second shoulder located at both ends of the tread outer side along the axial direction of the auto tire casing, the auto tire casing having an equatorial plane perpendicular to the axial direction and located at a central portion of the auto tire casing, and the first shoulder and the second shoulder are symmetrical with respect to the equatorial plane.

7. The walking mechanism according to claim 6, wherein the auto tire casing further includes a tread inner side opposite to the tread outer side and a plurality of reinforcing ribs located on the tread inner side between the first shoulder and the second shoulder, the reinforcing ribs being uniformly distributed along the circumferential direction of the auto tire casing.

8. The walking mechanism according to claim 6, wherein the first shoulder and the second shoulder have an inner side and an outer side, the inner side being closer than the outer side, the outer side including a flange extending toward the axial center of the auto tire casing, the flange extending parallel to the equatorial plane.

9. A walking mechanism for driving a machine body, the walking mechanism comprising:
    a walking wheel group including a plurality of walking wheels attached to the machine body, the walking wheels including two front wheels at a front of the machine body and two rear wheels at a rear of the machine body, a traveling direction of the machine body being from the rear of the machine body toward the front of the machine body, the machine body having two sides, a pair of one of the front wheels and a one of the rear wheels being respectively located on each of the sides, each pair being driven to rotate synchronously;
    each walking wheel including an auto tire casing with which the walking wheel can be supported on the ground, the auto tire casing having a tread outer side, each tread outer side having a tread pattern distributed along a circumferential direction of the auto tire casing, the tread pattern being configured as a plurality of tread ribs with a respective tread groove formed between each adjacent pair of the tread ribs, the tread pattern radiating outward from an axial center of the walking wheel;
    wherein an outer surface of each tread rib defines a plurality of protrusions and depressions along an extending direction of each of the tread ribs, each of the protrusions extending along an extending direction at an angle relative to the circumferential direction, wherein the angle is an acute angle.

10. The walking mechanism according to claim 9, wherein the angle is identical for each of the protrusions.

11. The walking mechanism according to claim 9, wherein the angle is no more than 10 degrees.

12. The walking mechanism according to claim 9, wherein the angle is no more than 5 degrees.

13. The walking mechanism according to claim 9, wherein the angle is not identical for all of the protrusions.

14. A robot comprising a machine body and the walking mechanism according to claim 9 mounted on the machine body.

15. A self-walking mower comprising a machine body and the walking mechanism according to claim 9 mounted on the machine body.

\* \* \* \* \*